United States Patent
Gryska

(10) Patent No.: US 7,212,568 B2
(45) Date of Patent: May 1, 2007

(54) ADAPTIVE EQUALIZER WITH INTEGRATED ALIGNMENT OF THE OUTPUT LEVEL

(75) Inventor: Holger Gryska, München (DE)

(73) Assignee: Infineon Technologies AG, München (DE)

( * ) Notice: Subject to any disclaimer, the term of this patent is extended or adjusted under 35 U.S.C. 154(b) by 822 days.

(21) Appl. No.: 10/623,072

(22) Filed: Jul. 18, 2003

(65) Prior Publication Data
US 2004/0057512 A1 Mar. 25, 2004

(30) Foreign Application Priority Data
Jul. 18, 2002 (DE) .................. 102 32 702

(51) Int. Cl.
*H03H 7/40* (2006.01)
(52) U.S. Cl. ..................................... 375/232
(58) Field of Classification Search ........ 375/229–233, 375/235–236; 708/322–323
See application file for complete search history.

(56) References Cited
U.S. PATENT DOCUMENTS 5,204,878 A * 4/1993 Larsson ...................... 375/232
5,805,639 A * 9/1998 Tonch et al. ............... 375/232
6,907,064 B1 * 6/2005 Tokunaga et al. .......... 375/232

FOREIGN PATENT DOCUMENTS

| DE | 695 20 824 T2 | 12/1995 |
| DE | 100 01 862 A1 | 11/2000 |
| EP | 0 524 560 B1 | 1/1993 |
| EP | 0 685 937 A1 | 12/1995 |

* cited by examiner

*Primary Examiner*—Khanh Tran
(74) *Attorney, Agent, or Firm*—Laurence A. Greenberg; Werner H. Stemer; Ralph E. Locher

(57) ABSTRACT

The transfer function of a filter processing unit is defined by a set of filter coefficients that are continually updated in a coefficient-updating unit. The level of the output signal is adjusted by a level-adjustment unit where, if the largest filter coefficient exceeds an upper threshold value or is below a lower threshold value, a comparator outputs control signals to coefficient-based shifters and to a data signal shifter such that these shift their applied bit sequences in opposite directions and thus multiply or divide the applied data signals by a factor $\geq 2$.

13 Claims, 3 Drawing Sheets

ADAPTIVE EQUALIZER WITH INTEGRATED ALIGNMENT OF THE OUTPUT LEVEL

BACKGROUND OF THE INVENTION

Field of the Invention

The present invention relates to a method for adaptive channel equalization and to an adaptive equalizer for carrying out the method.

In mobile and wired communication systems, one serious problem is multipath signal propagation. In a mobile communication system, for example, there are normally a plurality of possible signal propagation paths between a base station and a mobile station. Reflection and scattering of signal waves on buildings, mountains, trees and other obstacles result in the reception field strength being made up of a plurality of signal components which generally have different strengths and different delays. The transmission channel between the base station and the mobile station can be modelled as a transition filter channel with channel coefficients in order to take into account the multipath propagation. The transmission signals filtered with the channel coefficients are overlapped by a noise signal, which is adopted as additive, white Gaussian noise. Of greater significance, however, is "intersymbol interference" (ISI), which allows any mixing of the emitted transmission signals over time to be established for the reception data. Provided that there is no compensation therefor, intersymbol interference results in high bit error rates.

In a wired communication system, multipath propagation can occur in the field of digital cable television, for example, as a result of dispersion and reflection of the data signals in the cable. By way of example, wave reflections can occur at the end of an incorrectly terminated or unmatched cable. These are the cause of corresponding delay signals in the receiver.

To eliminate intersymbol interference, an equalizer is used within the receiver. In mobile communication systems, adaptive equalizers are necessary in order to be able to allow for the alteration in the multipath system over time as a result of adaptive alignment of the channel coefficients. These can be a linear equalizer, such as an adaptive FFE (Feed Forward Equalizer) or DFE (Decision Feedback Equalizer) or can be Viterbi equalizers or other maximum-likelihood equalizers.

In a manner which is known per se, the equalizer is followed by a decision device (e.g. slicer) which performs the actual signal detection. Between the equalizer and the decision-maker, the prior art requires a level-alignment stage which aligns the level of the signal after equalization, that is to say removal of the interference components, with the ensuing decision-maker.

FIG. 1 shows a block diagram of a conventional reception system. The analog input signal is amplified in an automatic level-alignment stage (AGC, Automatic Gain Control) in order to use the full dynamic range of the analog/digital converter (ADC) without clipping the pulse peaks. The filtering/decimation stage limits the receiver bandwidth by decimating in cases of oversampling by the ADC and by attenuating interference sources outside the bandwidth. The adaptive equalizer reduces the intersymbol interference (ISI) which has been introduced by the physical channel, and it attempts to attenuate the interference sources which are within the bandwidth. The AGC aligns the level of the signal, with the power of all interference sources being detected. When these interference sources have been removed by the filtering/decimation stage and the equalizer, a second level-alignment stage is necessary in order to align the level with the slicer levels. This task is performed by the DGC unit (Digital Gain Control). The slicer decides, on the basis of its threshold values and the input signal, which symbol from the transmission symbol alphabet has been transmitted. These symbols are then forwarded to the subsequent stages, such as the error correction unit. This customarily used division of tasks has two drawbacks. Since the level in the DGC is compensated for downstream of the equalizer, the dynamic range of the equalizer coefficients needs to be sufficiently wide for all possible level-adjustment stages. However, this increases the involvement for implementing the complex equalizer. Division of the equalization and level-adjustment tasks has the further drawback that the DGC stage requires a dedicated multiplier and a dedicated control algorithm.

Published European Patent application EP 0 524 560 B1, which is hereby incorporated by reference, discloses a method for updating filter coefficients for input to a filter stage in an adaptive equalizer, which is designed as an adaptive FFE equalizer (Feed Forward Equalizer) by way of example. The adaptive equalizer has a filter stage whose transfer function is defined by a set of filter coefficients, and also has updating means for updating the filter coefficients in response to error signals derived from an equalizer data output signal. The updating means comprise a plurality of successive delay elements which are coupled to one another in order to provide a plurality of delayed samples of unequalized signal data which are output for use when updating the coefficients. The updating means comprise a plurality of parallel processing paths for the filter coefficients. Each of the processing paths are provided with means for aligning the levels of the updated filter coefficients.

Published German Patent Application DE 100 01 862 A1, which is hereby incorporated by reference, describes an adaptive equalizer which has a filter processing unit having a plurality of series-connected processing stages, each of which forms a branch with corresponding branch coefficients. Each processing stage contains a multiplier, in order to multiply an input signal by a corresponding branch coefficient, a delay stage which delays the output signal from a preceding processing stage, and an adder which adds the output signal from the delay stage to the output signal from the multiplier such that the addition result is provided for the next stage. The first processing stage contains a multiplier which multiplies the input signal by a corresponding branch coefficient for application to the next processing stage. In addition, the adaptive equalizer contains a branch-coefficient-setting circuit for setting a branch coefficient in line with an error between an output signal from the filter processing stage and a reference signal. The branch-coefficient-setting circuit contains a coefficient-correction stage which is provided as appropriate for every branch coefficient. Every coefficient-correction stage has the same design and contains a multiplier which multiplies an input signal delayed according to the number of preceding stages by the error signal and a "step size". The step size is the same for every coefficient-correction stage.

SUMMARY OF THE INVENTION

It is accordingly an object of the invention to provide an adaptive equalizer and a method for adaptive channel equalization which allow the involvement for implementing the equalizer to be reduced. In particular, it is an object of the present invention to reduce the implementation involvement by integrating the equalization and level-alignment functions within the equalizer and to specify a circuit configuration that is suitable for this.

An adaptive equalizer for carrying out the inventive method incorporates a level-adjustment stage and thus combines the equalization function and the level-adjustment function by using circuitry with an appropriate level of involvement. The involvement for implementing the receiver circuit can thus be significantly reduced. The inventive method can be applied to an adaptive FFE equalizer (Feed Forward Equalizer) and to a DFE equalizer (Decision Feedback Equalizer). In circuit applications to date, the equalizer is followed by a separate level-adjustment stage (DGC) which aligns the signal level with the thresholds of the decision-maker independently of the equalizer. The invention now provides the opportunity to extend the limited tracking capability of the adaptive equalizer and to combine it with the separate level-adjustment stage, which significantly reduces the implementation involvement. The separate multiplier in the level-adjustment stage is dispensed with and is replaced by a simple data signal shifter connected to the output of the filter processing unit. The separate control logic in the level-adjustment stage is dispensed with. The combination allows the dynamic range of the equalizer to be restricted, so that the filter coefficient memories can end up being correspondingly smaller.

The inventive adaptive equalizer for carrying out the method has, in a manner which is known per se, an updating unit having a number of coefficient-based processing paths which each contain a shifter. If the largest of the filter coefficients becomes too large, the coefficient-based shifters are prompted to shift the bit sequences of the filter coefficients one bit position downwards and hence to halve the filter coefficients. At the same time, the data signal shifter connected to the output on the filter processing unit is prompted to shift the bit sequence of the output signal one bit position upwards.

If the largest filter coefficient becomes too small, the coefficient-base shifters are prompted to shift the bit sequences of the filter coefficients one bit position upwards and hence to double the filter coefficients. At the same time, the data signal shifter connected to the output on the filter processing unit is prompted to shift the bit sequence of the output signal one bit position downwards and hence to halve it.

The coefficient-based shifters, on the one hand, and the data signal shifter, on the other, thus shift their applied bit sequences in opposite directions as soon as it is established that the value of the largest filter coefficient is too large or too small.

To establish whether the largest filter coefficient becomes too large or too small, a lower and an upper threshold value are prescribed and the number of filter coefficients is compared with these threshold values. To this end, a comparator can be provided to which the filter coefficients are supplied. The comparator ascertains the largest filter coefficient if the position thereof is not already known a priori, and compares this filter coefficient with the lower and upper threshold values. The upper threshold value is, by way of example, the largest positive value which can be stored in the coefficient memory, and the lower threshold value is half of this. If the filter coefficient is below the lower threshold value or exceeds the upper threshold value, the comparator prompts the coefficient-based shifters and the data signal shifter to shift the bit sequences in opposite directions as described.

The filter processing unit used in the inventive adaptive equalizer is, in the most general form of the invention, a filter processing unit, such as an FIR filter (Finite Impulse Response) whose transfer function is defined by a set of filter coefficients.

The adaptive equalizer can be in the form of an FFE equalizer (Feed Forward Equalizer), the filter processing unit having a plurality of series-connected processing stages, with each of the processing stages having a delay element for delaying an output signal from a preceding processing stage, a multiplier for multiplying the output signal from the delay stage by a corresponding filter coefficient, and an adder for adding an output signal from the multiplier and an addition result from the preceding processing stage such that the subsequent processing stage is provided with an addition result.

The filter coefficients are updated in a coefficient-updating unit which is made up of a number of coefficient-updating stages. Each coefficient-updating stage has a delay element for delaying an output signal from a preceding coefficient-updating stage, a coefficient memory connected to the filter processing unit, a multiplier for multiplying the delayed signal by the error signal and an update factor, and an adder for adding the output signal from the multiplier and the value of the filter coefficient stored in the coefficient memory.

In this case, the delay elements contained in the coefficient-updating stages can be identical to the delay elements contained in the processing stages of the filter processing unit.

In one preferred variant embodiment of the inventive method, each coefficient-updating unit has a dedicated, independently adjustable update factor. In the initially mentioned prior art (DE 100 01 862 A1), this update factor (step size) is constant and is the same for all coefficient-updating units. This inventive variant can be used for introducing two different level-adaptation phases, namely an initial adaptation phase and a subsequent normal adaptation phase. The initial adaptation phase is distinguished in that various update factors can be created whose magnitude corresponds to the magnitude of the respective current filter coefficients. Initially, the shifters are loaded with a set of filter coefficients of which, by way of example, only the central filter coefficient is different from zero. Subsequently, during the initial level-adaptation phase, the multipliers in the coefficient-updating stages are thus each supplied update factors whose magnitude is proportional to the magnitude of the respective filter coefficient which is current in the corresponding stage. This has the advantage that the form of the initial coefficient template is altered only relatively little during the initial adaptation phase, and hence the stability of the adaptation algorithm is ensured. In a second normal adaptation phase, all the update factors are then the same.

Other features which are considered as characteristic for the invention are set forth in the appended claims.

Although the invention is illustrated and described herein as embodied in an adaptive equalizer with integrated alignment of the output level, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
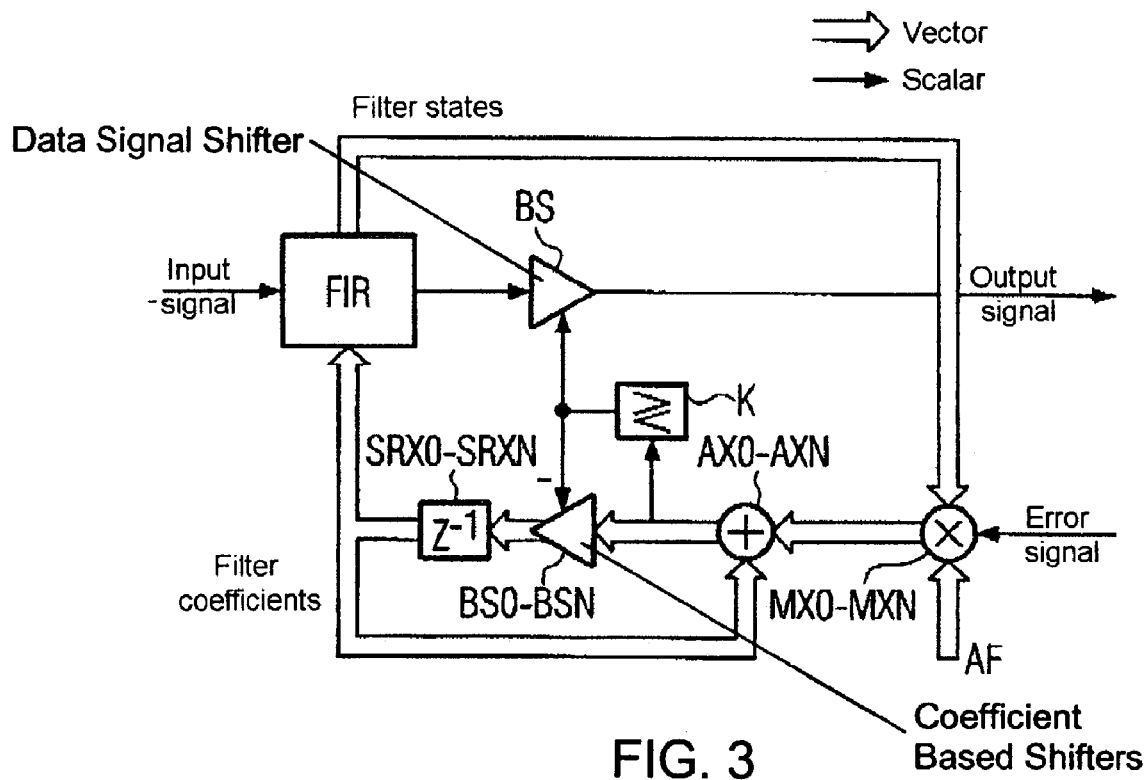
FIG. 3 is a vectorized illustration of the adaptive equalizer from FIG. 2.

Referring now to the figures of the drawing in detail and first, particularly, to FIG. 3 thereof, there is shown an exemplary embodiment of an inventive adaptive equalizer. In this case, the filter processing unit is represented, in its most general form, by an FIR filter whose transfer function is defined by a set of filter coefficients which are updated at the filter clock rate. The FIR filter is supplied with an input signal. An output signal is supplied to a data signal shifter BS that is part of a level-adjustment unit which is yet to be explained.

Figure 1:
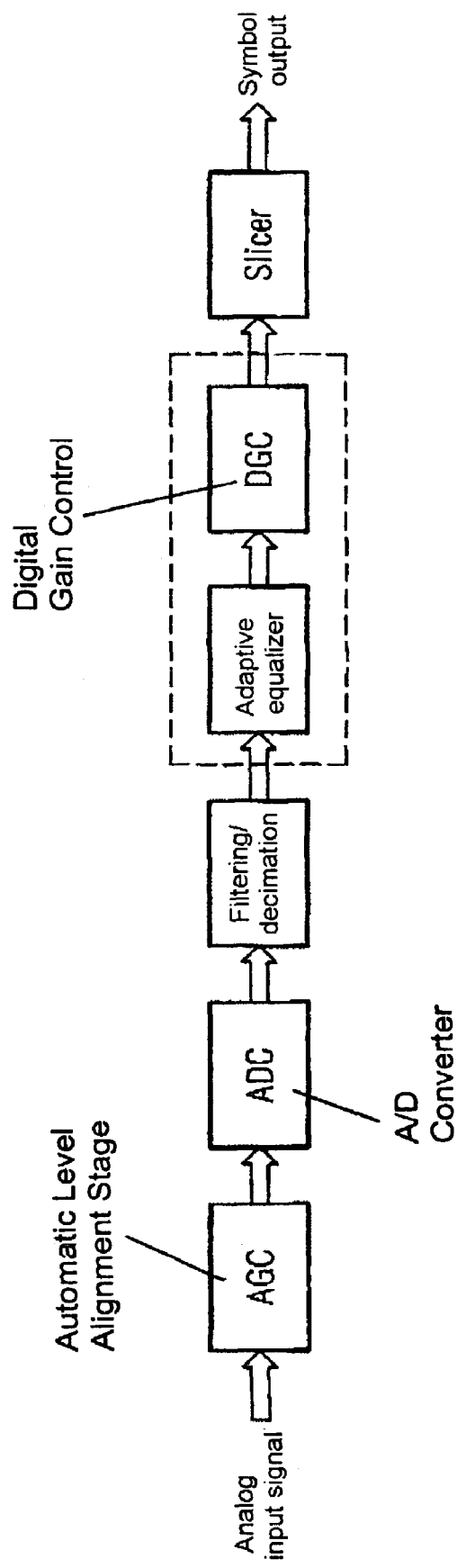
FIG. 1 is a block diagram of a prior art receiver concept.
Figure 2:
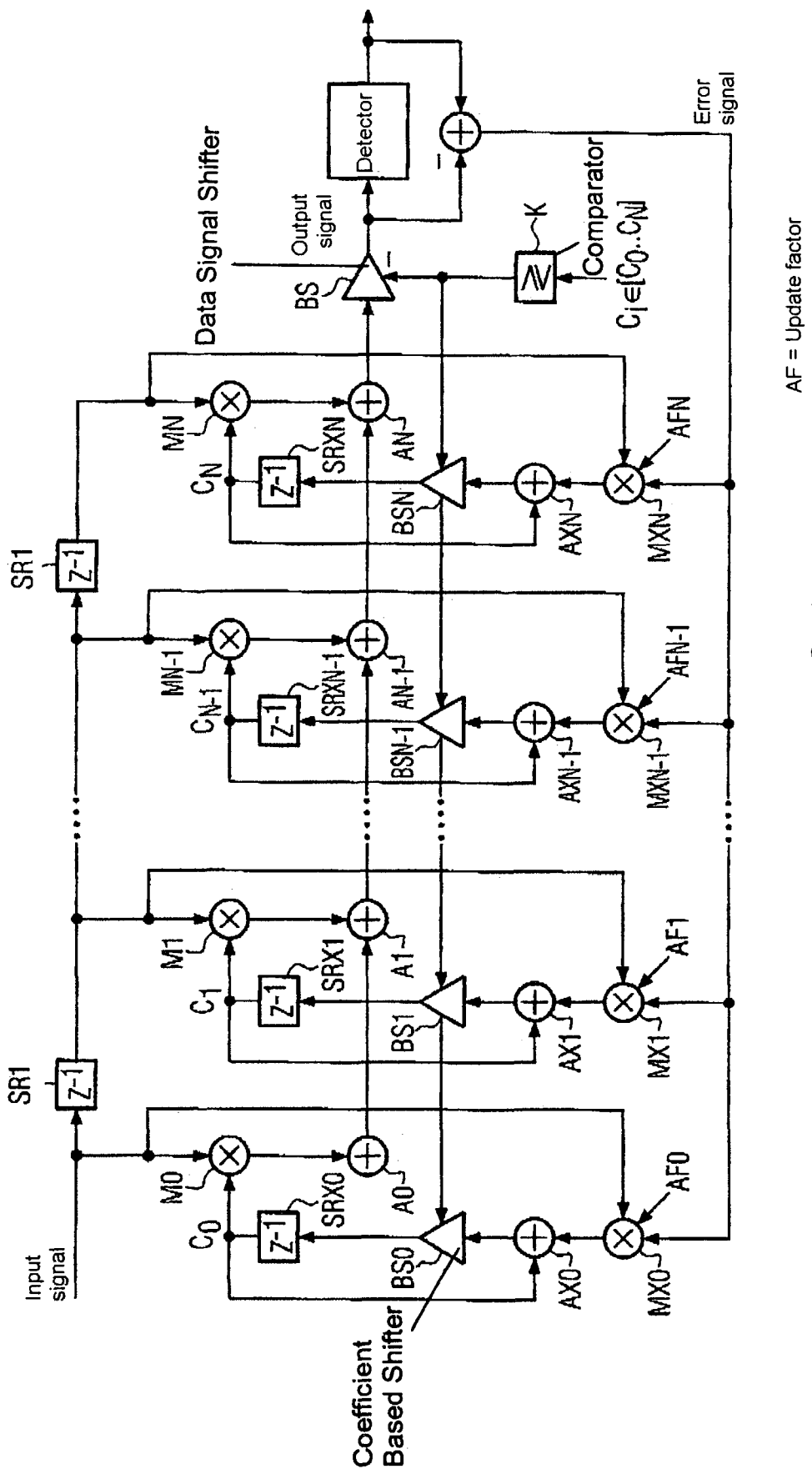
FIG. 2 is a circuit arrangement of an adaptive equalizer.

FIG. 2 shows the adaptive equalizer from FIG. 3 in scalable form. The FIR filter used is an adaptive FFE (Feed Forward Equalizer). The latter is made up of delay elements SR1–SRN, multipliers M0–MN and adders A0–AN (A0 can be omitted) in a manner which is known per se. The FFE can be regarded as N series-connected processing stages. Each of the processing stages has a delay element SR1–SRN, a multiplier M1–MN and an adder A1–AN. The illustrated embodiment contains a first processing stage that has a multiplier M0 which multiplies the undelayed input signal by a filter coefficient C0 and supplies the multiplication result to the adder A1 in the second processing stage. Similarly, the multipliers M1–MN multiply their inputs by corresponding filter coefficients C1–CN and supply the multiplication results to the adders A1–AN. The adders A1–AN add the output signal from the multipliers M1–MN to the addition result from the respective preceding processing stage, so that the subsequent processing stage is provided with a further addition result.

In addition, the adaptive equalizer in FIGS. 2 and 3 has a coefficient-updating unit which has a number N+1 of coefficient-updating stages. These are made up of multipliers MX0–MXN, adders AX0–AXN and coefficient memories SRX0–SRXN. The delay elements SR1–SRN already described as part of the filter processing stages likewise have an essential significance for coefficient-updating stages and can thus equally be regarded as parts of the coefficient-updating stages. It is similarly possible to provide for the coefficient-updating stages to have dedicated delay elements, as shown by way of example in FIG. 11 of German patent application DE 100 01 862 A1.

The filter coefficients are updated in response to an error signal which is derived from an output signal from the equalizer. Every coefficient-updating stage delays an output signal from a preceding coefficient-updating stage in a predetermined manner using a delay element SR1–SRN. The delayed signal is multiplied by the error signal, and the multiplication result is added, in an adder AX0–AXN, to a value that is stored in the coefficient memory SRX0–SRXN for the corresponding filter coefficient. The multipliers MX0–MXN are likewise supplied coefficient-specific update factors AF0–AFN. The error signal is obtained from decision feedback by supplying the equalized output signal to a detector in the form of a decision-maker or slicer, and subtracting the latter's input signal from its output signal using an adder.

In addition, the adaptive equalizer has a level-adjustment unit which has a comparator K for comparing the largest filter coefficient with a lower and an upper threshold value, coefficient-based shifters BS0–BSN in the coefficient-updating stages, and a data signal shifter BS at the output of the filter processing unit. The control inputs on the coefficient-based shifters BS0–BSN and on the data signal shifter BS (with an inverted arithmetic sign) are connected to an output on the comparator K. The input of the comparator K is supplied the filter coefficients. From these, the comparator K determines the respective largest filter coefficient if the position of the largest filter coefficient is not already known a priori, and it compares this filter coefficient with a lower and an upper threshold value. The upper threshold value can be, by way of example, the largest positive value which can be stored in the coefficient memory, while the lower threshold value can be half of this. If the upper threshold value is exceeded, it prompts the coefficient-based shifters BS0–BSN to shift the bit sequences of the filter coefficients one respective bit position downwards, and at the same time the comparator K prompts the data signal shifter BS to shift the bit sequence of the output signal from the filter processing unit one bit position upwards. If, by contrast, the comparator K establishes that the largest filter coefficient is below the lower threshold value, then it prompts the coefficient-based shifters BS0–BSN to shift the bit sequences of the filter coefficients one respective bit position upwards, and at the same time the comparator K prompts the data signal shifter to shift the bit sequence of the output signal from the filter processing unit 1 bit position downwards.

Figure 4:
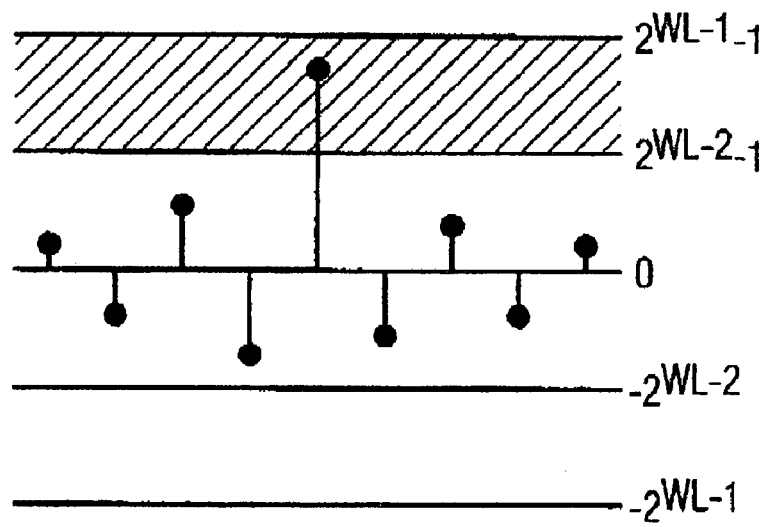
FIG. 4 is a graphical illustration of the filter coefficients and their relationship with the threshold values.

FIG. 4 shows, by way of example, a graphical illustration of nine filter coefficients in a graph, with the area between an upper and a lower threshold value being characterized by shading. FIG. 4 shows a snapshot in which the highest filter coefficient is situated within the shaded area, that is to say below the upper threshold value and above the lower threshold value. In this situation, the comparator K does not output an output signal to the control inputs of the coefficient-based shifters BS0–BSN and of the data signal shifter BS. The aim is to keep the highest filter coefficient in the shaded area. If the highest filter coefficient exceeds the upper threshold value $2^{WL-1}-1$, then all the filter coefficients are divided by 2 as a result of the shift in the bit sequences, and the highest filter coefficient is then situated in the shaded area again. To compensate for the 3-dB drop in the output level which is caused by this coefficient scaling, the output signal from the FFE filter is simultaneously multiplied by two. As already mentioned, this is done by virtue of the comparator K prompting the data signal shifter BS to shift the bit sequence of the applied signal one bit position upwards. If the highest filter coefficient drops below the lower threshold value $2^{WL-2}-1$, the filter coefficients are doubled by the bit shift operations already explained in the coefficient-based shifters, and the output signal from the FFE filter is divided by two by the data signal shifter BS.

The coefficient-based shifters BS0–BSN illustrated as individual components in FIG. 2 can also be formed on a hardware basis by an integrated vector shifter.

The coefficient-based shifters BS0–BSN and the data signal shifter BS can be formed by "barrel shifters". A barrel shifter is a special shifter which permits shifting (more precisely rotation) through any number of bits. It is thus also possible to bring about a shift of two bits, that is to say multiplication or division by the factor four, for example. A shift through one bit position is equivalent to doubling or halving the filter coefficients and thus to altering the levels thereof in stages of 3 dB. Fine adjustment of the levels is then brought about by adaptive alignment of the filter coefficients. The result is thus that the size of the coefficient memories SRX0–SRXN can be reduced. The coefficient memories SRX0–SRXN are shown in FIG. 2 using the same circuit symbols as the delay elements.

Alignment of the filter coefficients is based on an error algorithm, e.g. on the inherently known LMS algorithm (see section 5.7.2 "Iterative Entzerrereinstellung nach dem LMS-Algorithmus" [Iterative equalizer adjustment on the basis of the LMS algorithm] from the book "Nachrichtenübertragung" [Message transmission] by K. D. Kammeyer, Teubner Stuttgart). The error criterion which needs to be minimized by the. adaptive equalizer is weighted by an update factor AF0–AFN which can be chosen separately for each error coefficient and is multiplied by the error signal and the delayed input signals in the multipliers MX0–MXN. The vector for the update factors AF0–AFN thus has the dimension of the filter order.

I claim:

1. A method for adaptive channel equalization, which comprises:
   providing a filter processing unit having a transfer function defined by a set of filter coefficients;
   comparing a largest filter coefficient with a lower threshold value and an upper threshold value;
   updating the filter coefficients in response to an error signal derived from an output signal from the equalizer and adjusting an output signal level of the filter processing unit by:
      if the largest filter coefficient exceeds the upper threshold value, shifting bit sequences of the filter coefficients one bit position downwards and simultaneously shifting a bit sequence of an output signal from the filter processing unit one bit position upwards, and
      if the largest filter coefficient is below the lower threshold value, shifting the bit sequences of the filter coefficients one bit position upwards and simultaneously shifting the bit sequence of the output signal from the filter processing unit one bit position downwards.

2. The method according to claim 1, which comprises providing the filter processing unit with a plurality of processing stages; each of the processing stages:
   providing a delayed signal by delaying an output signal from a preceding processing stage in a predetermined manner;
   providing a multiplication result by multiplying the delayed signal by a filter coefficient; and
   adding the multiplication result to an addition result from a preceding processing stage such that a subsequent processing stage is provided with an addition result.

3. The method according to claim 2, wherein one of the plurality of the processing stages multiplies an input signal by a corresponding filter coefficient and delivers a multiplication result to an adder in a second one of the plurality of the processing stages.

4. The method according to claim 1, which comprises:
   for every filter coefficient, using a coefficient-updating stage to provide a delayed signal by delaying an output signal from a preceding coefficient-updating stage in a predetermined manner;
   obtaining a multiplication result by multiplying the delayed signal by the error signal weighted by an update factor; and
   adding the multiplication result to a stored value for a corresponding filter coefficient.

5. The method according to claim 4, which comprises:
   supplying an addition result obtained in the adding step to coefficient-based shifters;
   providing an output signal from the filter processing unit to a data signal shifter; and
   if the largest filter coefficient exceeds the upper threshold value or is below the lower threshold value, supplying control signals to control inputs on the coefficient-based shifters and to a control input, which has an inverted sign, of the data signal shifter.

6. The method according to claim 4, wherein the delayed signal is multiplied by the error signal and by an update factor.

7. The method according to claim 6, which comprises independently adjusting the update factor for each coefficient-updating stage.

8. The method according to claim 7, which comprises:
   in a first level-alignment phase, adjusting a magnitude of the update factor for each coefficient-updating stage based on magnitudes of the filter coefficients initially stored in corresponding coefficient-updating stages; and
   in a second level-alignment phase, adjusting the magnitude of the update factor for each coefficient-updating stage to be identical to one another.

9. An adaptive equalizer, comprising:
   a filter processing unit having a transfer function defined by a set of filter coefficients, said filter processing unit having an output;
   a coefficient-updating unit having a plurality of coefficient-updating stages; and
   a level-adjustment unit including:
      a comparator for comparing a largest one of said filter coefficients with a lower threshold value and an upper threshold value,
      a plurality of coefficient-based shifters having control inputs connected to said comparator, and
      a data signal shifter at said output of said filter processing unit, said data signal shifter having a control input connected to said comparator.

10. The adaptive equalizer according to claim 9, wherein:
    said filter processing unit has a plurality of series-connected processing stages; and
    each of said plurality of processing stages includes:
       a delay element for delaying an output signal from a preceding one of said plurality of processing stages,
       a multiplier for multiplying a delayed signal by a corresponding one of said filter coefficients, and
       an adder for adding an output signal from said multiplier and an addition result from a preceding one of said plurality of processing stages and for providing a subsequent one of said plurality of processing stages with an addition result.

11. The adaptive equalizer according to claim 10, wherein:
    said multiplier of a first one of said plurality of processing stages is for multiplying an input signal by a corresponding one of said filter coefficients; and
    said multiplier of said first one of said plurality of processing stages is connected to said adder of a second one of said plurality of processing stages.

12. The adaptive equalizer according to claim 9, wherein:
each one of said plurality of coefficient-updating stages includes:
 a delay element for delaying an output signal from a preceding one of said plurality of coefficient-updating stages,
 a coefficient memory connected to said filter processing unit,
 a multiplier for multiplying a delayed signal by an error signal, said multiplier providing an output signal, and
 an adder for adding the output signal from said multiplier and a value of one of said filter coefficients stored in said coefficient memory.

13. The adaptive equalizer according to claim 12, wherein:
said comparator has an output;
each one of said coefficient-based shifters has an input and an output, and a control input;
said coefficient memory has a plurality of inputs;
said adder of each one of said plurality of coefficient-updating stages has an output connected to said input of a respective one of said coefficient-based shifters;
said output of each one of said coefficient-based shifters is connected to a respective one of said plurality of inputs of said coefficient memory;
said control input of each one of said coefficient-based shifters is connected to said output of said comparator;
said output of said filter processing unit is connected to one of said coefficient-based shifters; and
said control input of each one of said coefficient-based shifters is connected to said output of said comparator.

* * * * *